Figure 1:
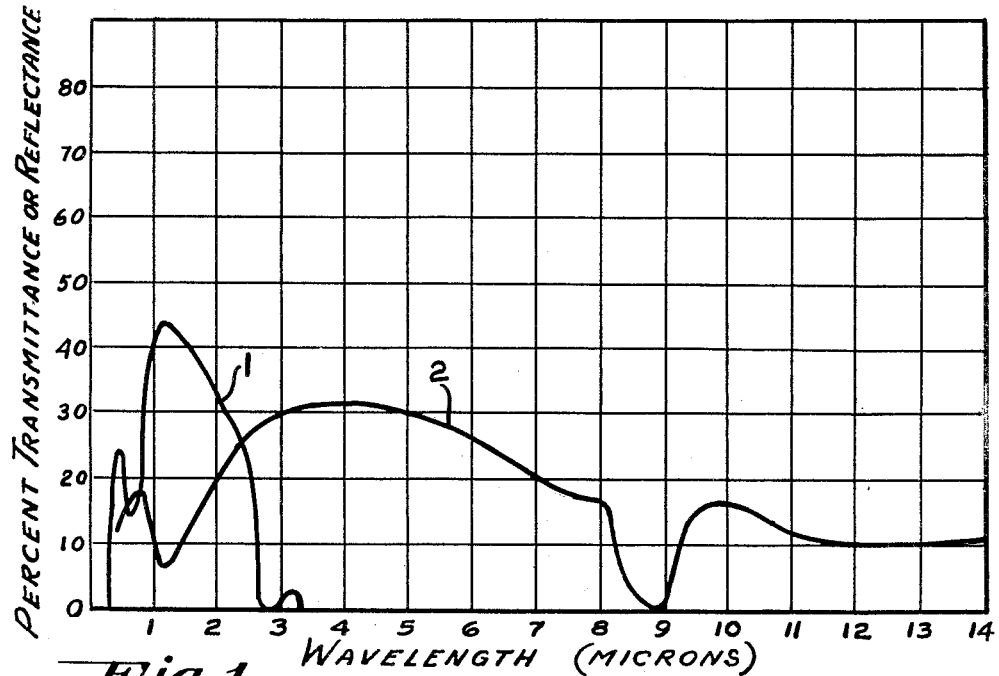

Sept. 22, 1964  H. C. JOHNSON  3,149,989
RADIATION-REFLECTING MEDIUM
Filed Dec. 1, 1961  2 Sheets-Sheet 1

INVENTOR
HAROLD C. JOHNSON
By Clarence R. Patty Jr.
ATTORNEY

INVENTOR
HAROLD C. JOHNSON

BY Clarence R. Patty Jr.
ATTORNEY

United States Patent Office 3,149,989
Patented Sept. 22, 1964

3,149,989
RADIATION-REFLECTING MEDIUM
Harold C. Johnson, Corning, N.Y., assignor to Corning Glass Works, Corning, N.Y., a corporation of New York
Filed Dec. 1, 1961, Ser. No. 156,392
12 Claims. (Cl. 117—33.3)

This invention relates to radiation-reflecting media and in particular to novel combinations of films for use therein.

Radiation-reflecting films are well known, and specific compositions comprising certain iridized metallic oxide films are disclosed, for example, in U.S. Patent 2,564,708, issued to J. M. Mochel. Such films have limited utility, however, in that their reflective efficacy for solar shielding purposes is substantially limited to wave lengths in the far infrared portion of the spectrum, which portion contains only a negligible part of the energy emitted by the sun.

It has been discovered that such metallic oxide films may be used advantageously in combination with other media having the ability to absorb energy in the visible and near infrared portions of the spectrum and subsequently to re-emit the same energy at wave lengths within the range reflected by such films. This discovery is disclosed in detail in a copending application, Serial No. 100,985, filed April 5, 1961, and assigned to the present assignee.

Although the compositions disclosed in the cited application exhibit satisfactory heat shielding qualities, such compositions have generally been aesthetically unsatisfactory in that the apparent colors of objects viewed therethrough have been distorted. Although such distortion can be tolerated in certain industrial applications, it is highly desirable that it be eliminated in applications where human comfort is a factor, such as homes and office buildings and in other applications where it is necessary that objects be seen in their natural colors.

Accordingly, it is an object of this invention to provide a window which is an efficient radiation-reflecting medium and which at the same time permits objects viewed therethrough to be seen in their natural colors.

It is a further object to provide a heat-reflecting window which reflects also a substantial amount of radiation throughout the visible portion of the spectrum so as to prevent glare while at the same time permitting objects to be viewed therethrough without distortion of color.

These objects are accomplished by the provision of a radiation-shielding window comprising a transparent material having thereon two films, each comprising a mixture of the oxides of tin and antimony, the film located nearer the source of radiation being an absorbing film, and the film located farther from the said source being a reflecting film.

Figure 2:
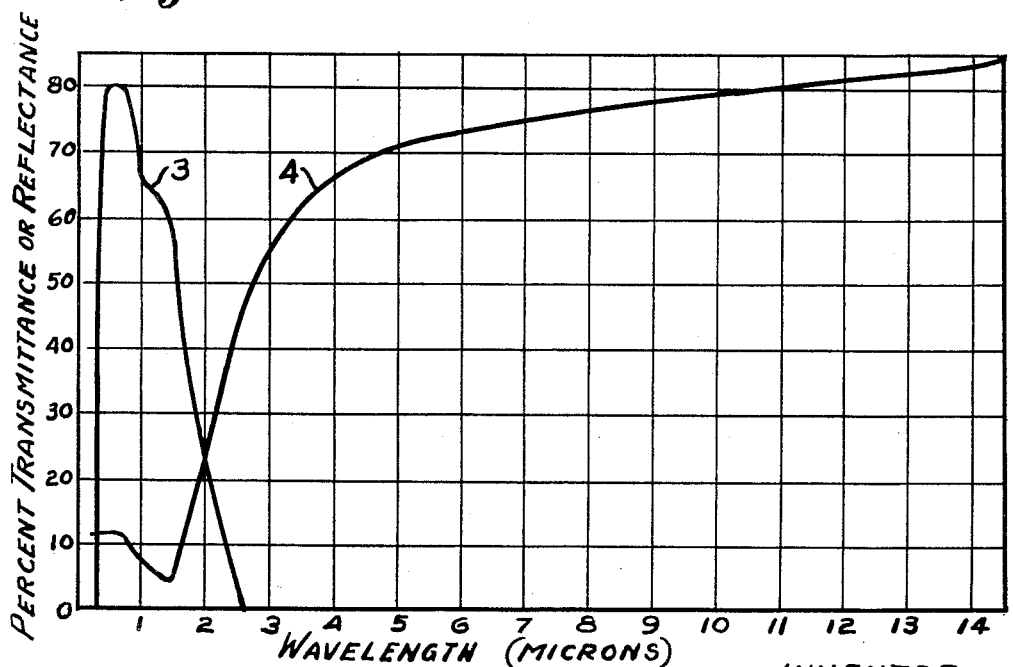
Figure 3:
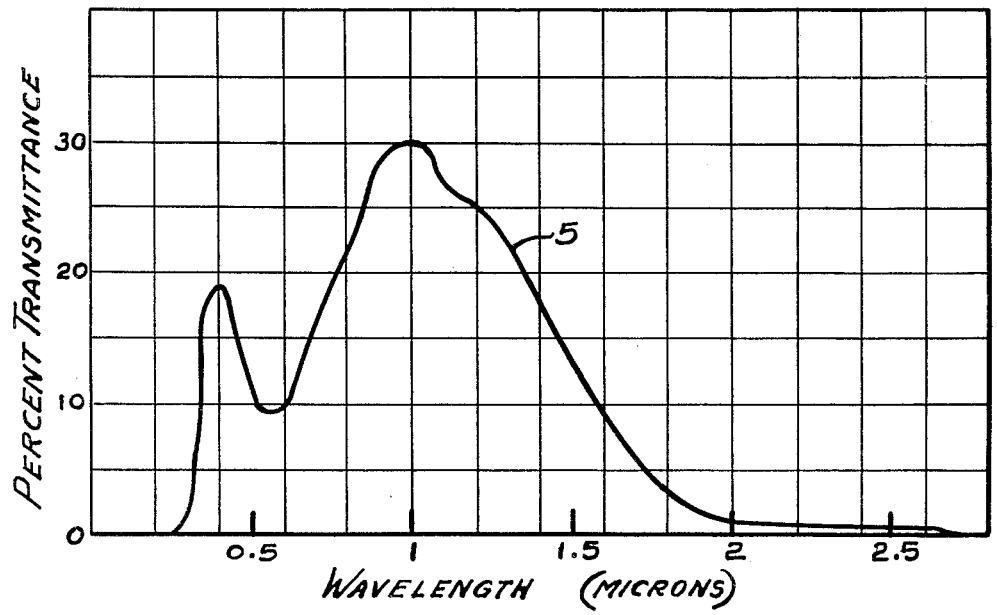
Figure 4:
Figure 5:
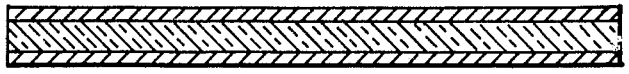

The invention will be described with reference to the accompanying drawing, in which:

FIGURE 1 is a graph giving the percentages of radiation transmitted and reflected at various wave lengths by an absorbing film utilized in a preferred embodiment of the invention, FIGURE 2 is a graph similar to that of FIGURE 1 for a reflecting film utilized in a preferred embodiment of the invention, FIGURE 3 is a graph similar to that of FIGURE 1 but on an enlarged scale giving the percent of radiation transmitted for the films of FIGURES 1 and 2 utilized in combination, FIGURE 4 is a sectional view of a piece of glass having thereon a combination of films according to the invention, and FIGURE 5 is a sectional view of a piece of glass having thereon an alternative combination of films according to the invention.

The energy-reflecting medium of the present invention comprises two films. The first of these films is an absorbing film having a substantially higher percentage of antimony than the reflecting film. These films are formed by conventional and well known methods, which generally comprise contacting a heated glass surface with a vapor or an atomized solution of one or more thermally decomposable metal salts or metallo-organic compounds which decompose to produce corresponding metallic oxide films on the heated surface. For a more detailed description, reference is made to previously-mentioned U.S. Patent 2,564,708.

The films of this invention are produced by application to a hot glass surface of solutions comprising as their film-forming solutes varying percentages of $SnCl_4 \cdot 5H_2O$ and $SbCl_3$. The solutes decompose to form oxides of the respective metals. For the present purposes the compositions of the various films utilizing the oxide combinations will be defined as computed in the conventional manner on the respective bases of $SnO_2$ and $Sb_2O_3$.

It has been found that the most satisfactory reflecting medium can be produced when the absorbing coating is deposited from a solute comprising $SnCl_4 \cdot 5H_2O$ and $SbCl_3$ in the ratio 85:15 by weight and the reflecting coating is deposited from a solute comprising the same components in the ratio 99.5:0.5 by weight. Computed as $SnO_2$ and $Sb_2O_3$ in the film, the respective ratios become 79.2:20.8 and 99.3:.07.

As part of the description of a preferred embodiment, the reflecting and transmitting characteristics of these films singly and in combination are given in FIGURES 1–3.

FIGURE 1 presents transmittance and reflectance data, in curves 1 and 2 respectively, for an absorbing film computed as 79.2% $SnO_2$ and 20.8% $Sb_2O_3$ having a thickness described as third order green and deposited on a sheet of borosilicate glass having a composition approximately 80% $SiO_2$, 14% $B_2O_3$, 4% $Na_2O$ and 2% $Al_2O_3$ by weight and a thickness of 6.66 millimeters. As can be seen from FIGURE 1, this absorbing film transmits percentages varying between 0–43% and reflects percentages varying between 0–32%. The percentage of each wave length absorbed and re-emitted as longer wave lengths is approximately equal to 100% minus the sum of the percentages transmitted and reflected. The wave lengths of the re-emitted energy can be calculated as a function of temperature according to well known physical laws.

FIGURE 2 gives corresponding data, in curves 3 and 4 respectively, for a third order red reflecting film computed as 99.3% $SnO_2$ and 0.7% $Sb_2O_3$. Curve 3 illustrates the ability of such a film to transmit percentages of the visible and near infrared spectrum as high as 80% while transmitting no wave lengths in the far infrared longer than about 3.5 microns. Curve 4 illustrates the tendency of the film to reflect only small percentages of the visible wave lengths while reflecting up to 85% in the far infrared.

The curves of FIGURES 1 and 2 do not represent precisely the transmittance and reflectance characteristics of the respective films under actual operating conditions. It would be expected that under such conditions the sum of the total energy transmitted and reflected would approximate 100% of that falling upon the medium. This figure is not approached in the curves of FIGURES 1 and 2, since the data of all the curves of the drawings were taken from windows which had not been heated to their operating temperatures, and hence the disparity represents absorbed radiation. In actual operation this energy would be partially conducted away and partially re-emitted as heat radiation. As would be expected, the absorbing film represented in FIGURE 1 exhibits the greater disparity, since it is designed to absorb large amounts of radiation. In actual operation this absorbed radiation is re-emitted at wave lengths which are dependent upon the temperature of the window and are subsequently reflected by the reflecting film.

When these two films are utilized in combination, the result is transmission curve 5, illustrated in FIGURE 3. It can be seen that this combination transmits energy at a maximum of 30% for wave lengths of about 1 micron and transmits no energy in the far infrared beyond 2.7 microns. Visible radiation is transmitted in amounts varying between about 9% and 21%, thus accounting for the glare reduction and the substantial color transmission fidelity of the combination.

A window employing this combination of films is gray in appearance, while objects viewed therethrough are seen with very little distortion of color. The amount of antimony in the reflecting film may be increased to the amount represented by about 1% $SbCl_3$ in the solute (1.5% computed as $Sb_2O_3$ in the film) without altering these characteristics; however, for amounts in excess of 1% $SbCl_3$ in the solute, objects viewed through the combination begin to take on a blue tint until at about 3% $SbCl_3$ in the solute (4.4% computed as $Sb_2O_3$ in the film) the glass and objects viewed therethrough have a deep blue tint. As the amount of antimony is decreased below ½% $SbCl_3$ in the solute, higher percentages of infrared transmission result until at approximately 0.3% $SbCl_3$ (0.4% computed as $Sb_2O_3$ in the film) only about 60% of infrared radiation is reflected, and when there is no antimony in the reflecting film, this value falls to about 30%. As the amount of antimony is increased beyond 3% $SbCl_3$, the infrared reflectivity decreases to a value of about 30% at 5% $SbCl_3$ (7.3% computed as $Sb_2O_3$ in the film).

When the amount of antimony in the absorbing film is decreased, objects viewed through the combination begin to take on a blue tint until at about 10% $SbCl_3$ (14.1% computed as $Sb_2O_3$ in the film) such objects are substantially blue in color. As the amount of antimony in the absorbing film is increased, such objects take on a red tint until at about 20% $SbCl_3$ (27.2% computed as $Sb_2O_3$ in the film) they have a definite red hue. Slightly blue or red tints are not objectionable and in some instances present a pleasing appearance; consequently, all combinations within this range are satisfactory for many applications.

Films according to this invention may vary in thickness, and the amount of luminous energy transmitted by the combination of films can be decreased by increasing the thickness of the absorbing films. The use of a fourth order red film as the absorbing film of the illustrated embodiment results in transmission of about 20% of visible radiation, while a first order red film as the absorbing film gives a corresponding figure of about 50%. The ability of the reflecting film to reflect infrared radiation is a function of its thickness. Increased thickness of the reflecting film gives increased infrared reflectivity. The relationship pertains up to approximately a third order red film. Beyond this point, gains in reflectivity are slight.

The films of this invention may be placed both on the same side of the glass or on opposite sides, as illustrated respectively in FIGURES 4 and 5. In the above example, the films were placed both on the side of the glass away from the source of radiation. The only requirement is that the absorbing film be the one nearer the source of radiation.

I claim:

1. A radiation-reflecting medium comprising a substantially transparent glass sheet having thereon two films, one of said films comprising a combination of approximately 0.4–4.4% by weight of an oxide of antimony computed as $Sb_2O_3$ and approximately 95.6–99.6% by weight of an oxide of tin computed as $SnO_2$ and the other of said films comprising a combination of approximately 14.1–27.2% by weight of an oxide of antimony computed as $Sb_2O_3$ and approximately 72.8–85.9% by weight of an oxide of tin computed as $SnO_2$.

2. A radiation-reflecting medium comprising a substantially transparent glass sheet having thereon two films, one of said films comprising a combination of approximately 0.4–1.5% by weight of an oxide of antimony computed as $Sb_2O_3$ and approximately 98.5–99.6% by weight of an oxide of tin computed as $SnO_2$ and the other of said films comprising a combination of approximately 14.1–27.2% by weight of an oxide of antimony computed as $Sb_2O_3$ and approximately 72.8–85.9% by weight of an oxide of tin computed as $SnO_2$.

3. A radiation-reflecting medium comprising a substantially transparent glass sheet having thereon two films, one of said films comprising a combination of approximately 0.7–4.4% by weight of an oxide of antimony computed as $Sb_2O_3$ and approximately 95.6–99.3% by weight of an oxide of tin computed as $SnO_2$ and the other of said films comprising a combination of approximately 14.1–27.2% by weight of an oxide of antimony computed as $Sb_2O_3$ and approximately 72.8–85.9% by weight of an oxide of tin computed as $SnO_2$.

4. A radiation-reflecting medium comprising a substantially transparent glass sheet having thereon two films, one of said films comprising a combination of approximately 0.7–1.5% by weight of an oxide of antimony computed as $Sb_2O_3$ and approximately 98.5–99.3% by weight of an oxide of tin computed as $SnO_2$ and the other of said films comprising a combination of approximately 14.1–27.2% by weight of an oxide of antimony computed as $Sb_2O_3$ and approximately 72.8–85.9% by weight of an oxide of tin computed as $SnO_2$.

5. A radiation-reflecting medium comprising a substantially transparent glass sheet having thereon two films, one of said films comprising a combination of approximately 0.7% by weight of an oxide of antimony computed as $Sb_2O_3$ and approximately 99.3% by weight of an oxide of tin computed as $SnO_2$ and the other of said film comprising a combination of approximately 20.8% by weight of an oxide of antimony computed as $Sb_2O_3$ and approximately 79.2% by weight of an oxide of tin computed as $SnO_2$.

6. A radiation-reflecting medium comprising a substantially transparent glass sheet having thereon two films, one of said films comprising a combination of approximately 4.4% by weight of an oxide of antimony computed as $Sb_2O_3$ and approximately 95.6% by weight of an oxide of tin computed as $SnO_2$ and the other of said film comprising a combination of approximately 20.8% by weight of an oxide of antimony computed as $Sb_2O_3$ and approximately 79.2% by weight of an oxide of tin computed as $SnO_2$.

7. A radiation-reflecting medium comprising a substantially transparent glass sheet having on one side thereof two films, one superimposed upon the other, one of said films comprising a combination of approximately 0.4–4.4% by weight of an oxide of antimony computed as $Sb_2O_3$ and approximately 95.6–99.6% by weight of an oxide of tin computed as $SnO_2$ and the other of said films comprising a combination of approximately 14.1–27.2% by weight of an oxide of antimony computed as $Sb_2O_3$ and approximately 72.8–85.9% by weight of an oxide of tin computed as $SnO_2$.

8. A radiation-reflecting medium comprising a substantially transparent glass sheet having on one side thereof two films, one superimposed upon the other, one of said films comprising a combination of approximately 0.4–1.5% by weight of an oxide of antimony computed as $Sb_2O_3$ and approximately 98.5–99.6% by weight of an oxide of tin computed as $SnO_2$ and the other of said films comprising a combination of approximately 14.1–27.2% by weight of an oxide of antimony computed as $Sb_2O_3$ and approximately 72.8–85.9% by weight of an oxide of tin computed as $SnO_2$.

9. A radiation-reflecting medium comprising a substantially transparent glass sheet having on one side thereof two films, one superimposed upon the other, one of said films comprising a combination of approximately 0.7–4.4% by weight of an oxide of antimony computed as $Sb_2O_3$ and approximately 95.6–99.3% by weight of an oxide of tin computed as $SnO_2$ and the other of said films comprising a combination of approximately 14.1–27.2% by weight of an oxide of antimony computed as $Sb_2O_3$ and approximately 72.8–85.9% by weight of an oxide of tin computed as $SnO_2$.

10. A radiation-reflecting medium comprising a substantially transparent glass sheet having on one side thereof two films, one superimposed upon the other, one of said films comprising a combination of approximately 0.7–1.5% by weight of an oxide of antimony computed as $Sb_2O_3$ and approximately 98.5–99.3% by weight of an oxide of tin computed as $SnO_2$ and the other of said films comprising a combination of approximately 14.1–27.2% by weight of an oxide of antimony computed as $Sb_2O_3$ and approximately 72.8–85.9% by weight of an oxide of tin computed as $SnO_2$.

11. A radiation-reflecting medium comprising a substantially transparent glass sheet having on one side thereof two films, one superimposed upon the other, one of said films comprising a combination of approximately 0.7% by weight of an oxide of antimony computed as $Sb_2O_3$ and approximately 99.3% by weight of an oxide of tin computed as $SnO_2$ and the other of said films comprising a combination of approximately 20.8% by weight of an oxide of antimony computed as $Sb_2O_3$ and approximately 79.2% by weight of an oxide of tin computed as $SnO_2$.

12. A radiation-reflecting medium comprising a substantially transparent glass sheet having on one side thereof two films, one superimposed upon the other, one of said films comprising a combination of approximately 4.4% by weight of an oxide of antimony computed as $Sb_2O_3$ and approximately 95.6% by weight of an oxide of tin computed as $SnO_2$ and the other of said films comprising a combination of approximately 20.8% by weight of an oxide of antimony computed as $Sb_2O_3$ and approximately 79.2% by weight of an oxide of tin computed as $SnO_2$.

References Cited in the file of this patent

UNITED STATES PATENTS

| | | |
|---|---|---|
| 2,403,685 | Sachtleben et al. | July 9, 1946 |
| 2,564,677 | Davis | Aug. 21, 1951 |
| 2,564,708 | Mochel | Aug. 21, 1951 |
| 2,741,157 | Goethert | Apr. 10, 1956 |
| 3,078,693 | Lythe | Feb. 26, 1963 |